(12) United States Patent
Hofler et al.

(10) Patent No.: US 8,554,434 B2
(45) Date of Patent: Oct. 8, 2013

(54) METHOD FOR ACTUATING A CLUTCH OF A HYDRODYNAMIC TORQUE CONVERTER

(75) Inventors: Hans Hofler, Immenstaad (DE); Thomas Kurz, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 90 days.

(21) Appl. No.: 13/063,519

(22) PCT Filed: Sep. 29, 2009

(86) PCT No.: PCT/EP2009/062594
§ 371 (c)(1),
(2), (4) Date: Mar. 11, 2011

(87) PCT Pub. No.: WO2010/046205
PCT Pub. Date: Apr. 29, 2010

(65) Prior Publication Data
US 2011/0190997 A1    Aug. 4, 2011

(30) Foreign Application Priority Data

Oct. 23, 2008   (DE) .......................... 10 2008 043 104

(51) Int. Cl.
*F16H 61/14* (2006.01)
*F16H 59/54* (2006.01)
*F16H 59/66* (2006.01)

(52) U.S. Cl.
CPC .............. *F16H 61/143* (2013.01); *F16H 59/54* (2013.01); *F16H 59/66* (2013.01)
USPC ............................... 701/68; 477/171; 477/172

(58) Field of Classification Search
CPC ........ F16H 61/143; F16H 59/54; F16H 59/66
USPC ......................... 701/68; 74/473.11; 477/171
See application file for complete search history.

(56) References Cited

U.S. PATENT DOCUMENTS

| 4,257,503 | A  |   | 3/1981  | Lutnick |
|---|---|---|---|---|
| 4,961,484 | A  | * | 10/1990 | Kato et al. .................... 192/3.31 |
| 5,794,170 | A  | * | 8/1998  | Kuroda et al. ................... 701/93 |
| 5,816,979 | A  |   | 10/1998 | Shiiba et al. |
| 6,231,480 | B1 |   | 5/2001  | Sasaki |
| 6,512,971 | B2 | * | 1/2003  | Koumura et al. ............... 701/51 |
| 6,620,077 | B2 |   | 9/2003  | Carlson et al. |
| 6,676,561 | B2 | * | 1/2004  | Fritzer et al. .................... 477/70 |
| 6,939,265 | B2 | * | 9/2005  | Rustige et al. .................. 477/84 |
| 8,012,061 | B2 | * | 9/2011  | Lin ................................. 477/80 |

FOREIGN PATENT DOCUMENTS

| DE | 29 44 410 A1 | 8/1980 | |
| DE | 197 17 355 A1 | 11/1997 | |
| DE | 698 12 469 T2 | 1/2004 | |
| DE | 10 2005 004 227 A1 | 11/2006 | |
| EP | 1 288 533 A2 | 3/2003 | |
| GB | 2397396 A * | 7/2004 | ............. F16H 61/02 |
| JP | 62 246657 A | 10/1987 | |

* cited by examiner

Primary Examiner — James Trammell
Assistant Examiner — Todd Melton
(74) Attorney, Agent, or Firm — Davis & Bujold, PLLC; Michael J. Bujold

(57) ABSTRACT

A method of actuating a clutch of a hydrodynamic torque converter in a self-propelling working machine such that when the clutch is engaged and thereby connects a drive input of the hydrodynamic torque converter to a drive output of the hydrodynamic torque converter, and when a service brake is actuated, the clutch is disengaged thereby separating a drive input of the hydrodynamic torque converter from a drive output of the hydrodynamic torque converter. The method comprises the steps of, when the service brake is actuated, actuating the clutch in the engaging direction, and maintaining engagement of the clutch if a device for recognizing a driving status of the working machine detects that the working machine is driving downhill.

12 Claims, No Drawings

METHOD FOR ACTUATING A CLUTCH OF A HYDRODYNAMIC TORQUE CONVERTER

This application is a National Stage completion of PCT/EP2009/062594 filed Sep. 29, 2009, which claims priority from German patent application serial no. 10 2008 043 104.4 filed Oct. 23, 2008.

FIELD OF THE INVENTION

The invention relates to a method for actuating a clutch of a hydrodynamic torque converter, of the type defined in more detail in the preamble of Claim 1.

BACKGROUND OF THE INVENTION

Clutches of this type in torque converters are actuated in the engaging direction in order to connect the drive input of the torque converter with its drive output, such that direct through-drive from the drive input to the drive output takes place, which results in improved efficiency. These clutches are often actuated in the engaging direction when the turbine torque is of the same size as the pump torque with the clutch engaged or disengaged. The shift-point concerned is determined by the rotational speed difference between the pump impeller wheel and the turbine wheel of the hydrodynamic torque converter.

DE 29 44 410 C2 discloses a bridging clutch of a hydrodynamic torque converter, which remains actuated in the engagement direction until a service brake is actuated, in order reliably to avoid stalling the engine as a result of blocking the wheels.

DETAILED DESCRIPTION OF THE PREFERRED EMBODIMENTS

The purpose of the present invention is to provide a method for actuating a clutch of a hydrodynamic torque converter, which further improves the operating reliability of the vehicle.

This objective is achieved by a method for actuating a clutch of a hydrodynamic torque converter.

According to the invention, the clutch of the hydrodynamic torque converter is actuated in the engaging direction by virtue of vehicle status parameters, and also remains actuated in the engaging direction when a service brake is actuated and a device for recognizing the vehicle status detects that the vehicle is driving downhill. Since the clutch remains engaged even when driving downhill, the vehicle can be retarded by means of both the service brake and the engine brake. On the other hand, if the vehicle is not driving downhill the engaged clutch is actuated in the disengaging direction when the service brake is actuated. This makes it possible, for example in the case of a working machine such as a wheel loader, to increase the speed of the drive engine substantially and at the same time to retard the vehicle, in order to be able to obtain sufficient speed at the hydraulic pump for the working hydraulic system, for example in order to raise a scoop of the wheel loader rapidly.

In another version of the invention, the clutch is again actuated in the engaging direction when the service brake is no longer actuated and corresponding shift-points, for example related to the turbine and pump speeds, have been reached. The clutch is actuated by a transmission control unit, which receives signals, for example speed signals from the turbine wheel and the pump wheel of the hydrodynamic torque converter or characteristic signals from the drive engine, for example the torque provided by the drive engine. The transmission control unit evaluates the signals and actuates the clutch as a function of the operating parameters of the vehicle.

In a further embodiment of the invention the clutch is actuated in the disengaging direction even though the service brake is actuated and the vehicle is driving "downhill", if the speed of the vehicle is lower than a defined value.

The downhill driving situation can for example be recognized from the drive engine torque detected, or by means of a level switch. Actuation of the service brake can be recognized for example from the brake pedal position or from the brake pressure.

Since the clutch can be actuated in the engaging direction, the efficiency can be improved. By actuating the clutch in the disengaging direction when the brake pedal is actuated, it is possible to increase the speed of the drive engine and hence that of the working pump of the working machine, even if the criteria for engaging the clutch are fulfilled. Since the clutch remains actuated in the engaging direction even when the service brake is actuated while driving downhill, some of the load on the service brake can be relieved because braking of the vehicle can be assisted by the engine brake.

The invention claimed is:

1. A method of automatically actuating a lockup clutch of a hydrodynamic torque converter in a self-propelling working machine such that when the lockup clutch is actuated in an engaging direction, the lockup clutch engages and thereby connects a drive input of the hydrodynamic torque converter to a drive output of the hydrodynamic torque converter to facilitate direct drive therebetween, and when both a service brake is actuated and the working machine is traveling downhill, the lockup clutch is actuated in a disengaging direction, the method comprising the steps of:

using a device for recognizing when the working machine is traveling downhill to detect when the working machine is traveling downhill;

actuating the lockup clutch in the engaging direction when the service brake is actuated, and maintaining engagement of the lockup clutch only if the device for recognizing when the working machine is traveling downhill detects that the working machine is traveling downhill so as to facilitate retarding of the working machine by means of both the service brake and the engine brake.

2. The method for actuating the lockup clutch according to claim 1, further comprising the step of actuating the lockup clutch in the disengaging direction when the service brake is actuated and driving downhill is detected, if a speed of the working machine is lower than a defined value.

3. The method for actuating the lockup clutch according to claim 1, further comprising the step of actuating the lockup clutch in the disengaging direction when the service brake is actuated and driving downhill is detected, if torque on a shaft of the drive input is above a defined value.

4. The method for actuating the lockup clutch according to claim 1, further comprising the step of detecting downhill driving via the torque of a drive engine.

5. The method for actuating the lockup clutch according to claim 1, further comprising the step of detecting the actuation of the service brake from one of a brake pedal position and a brake pressure.

6. The method for actuating the lockup clutch according to claim 1, further comprising the step of automatically actuating the lockup clutch in the engaging direction, after actuating the lockup clutch in the disengaging direction, if the service brake has not been actuated and a speed of the drive input is in a range of a speed of the drive output.

7. The method for actuating the lockup clutch according to claim 1, further comprising the steps of determining, with a transmission electronic system, a speed of the drive input, a speed of the drive output, at least one of a brake pedal position and a brake pressure and a torque delivered by a drive engine, and accordingly automatically controlling the lockup clutch via the transmission electronic system based upon at least one of the speed of the drive input, the speed of the drive output, at least one of the brake pedal position and the brake pressure and the torque delivered by a drive engine.

8. The method for actuating the lockup clutch according to claim 1, further comprising the step of transmitting torque delivered by a drive engine via a CAN signal received by a transmission control unit which uses the torque, delivered by the drive engine, for detecting a downhill driving situation.

9. The method for actuating the lockup clutch according to claim 1, further comprising the step of actuating the lockup clutch in the disengaging direction when both the service brake is actuated and the working machine is not driving downhill.

10. The method for actuating the lockup clutch according to claim 9, further comprising the step of using a level switch device for recognizing when the working machine is traveling downhill.

11. A method for automatically actuating a clutch of a hydrodynamic torque converter in a self-propelled wheel loader, the lockup clutch engaging a drive input of the hydrodynamic torque converter with a drive output of the hydrodynamic torque converter to facilitate direct drive therebetween when the lockup clutch is actuated in an engaging direction and the lockup clutch being automatically actuated in a disengaging direction to disengage the drive input of the hydrodynamic torque converter from the drive output of the hydrodynamic torque converter when a service brake is actuated; the method comprising the steps of:

using a device for recognizing when the wheel loader is traveling downhill to detect when the working machine is traveling downhill, retaining engagement of the lockup clutch only when the service brake is actuated and the device for recognizing when the wheel loader is traveling downhill determines that the wheel loader is traveling downhill;

automatically actuating the lockup clutch in the disengaging direction, if the wheel loader is traveling at a speed lower than a defined value, when the service brake is actuated and the device for recognizing when the wheel loader is traveling downhill determines that the wheel loader is traveling downhill;

automatically actuating the lockup clutch in the disengaging direction, if a torque on a shaft of the drive is greater than a defined torque value, when the service brake is actuated and the device for recognizing when the wheel loader is traveling downhill determines that the wheel loader is driving downhill;

detecting the actuation of the service brake based on at least one of a brake pedal position and a brake pressure;

re-actuating the lockup clutch in the engaging direction, after actuating the lockup clutch in the disengaging direction, when the service brake has not been actuated and the drive input and the drive output of the hydrodynamic torque converter are rotating at an approximately same speed;

determining the rotational speed of the drive input, the rotational speed of the drive output, one of the brake pedal position and the brake pressure and the drive engine torque with a transmission electronic system;

transmitting a CAN signal regarding the drive engine torque to a transmission control unit; and detecting a downhill driving situation with the transmission control unit based on the CAN signal transmitted thereto.

12. A method of automatically actuating a clutch of a hydrodynamic torque converter in a self-propelling working machine, the hydrodynamic torque converter comprising the lockup clutch, a turbine wheel and a pump wheel, the lockup clutch transmitting direct drive from the pump wheel to the turbine wheel of the hydrodynamic torque converter in a self-propelling working machine when the lockup clutch is engaged, the method comprising the steps of:

using a level switch device for recognizing when the working machine is traveling downhill, automatically engaging the lockup clutch, based on speed signals of the turbine wheel and the pump wheel of the hydrodynamic torque converter;

monitoring actuation of the level switch device for detecting downhill driving of the working machine;

automatically disengaging the lockup clutch when both the service brake of the working machine are actuated and downhill driving of the working machine is not detected by the level switch device;

maintaining engagement of the lockup clutch when the service brake is actuated and downhill driving of the working machine is detected by the level switch device; and automatically disengaging the lockup clutch when the service brake is actuated, downhill driving of the working machine is detected by the level switch device and a speed of the vehicle is lower than a defined speed.

\* \* \* \* \*